April 2, 1929.  F. G. BROTZ  1,707,297
BASKET FOR DISHWASHERS
Filed Aug. 12, 1927
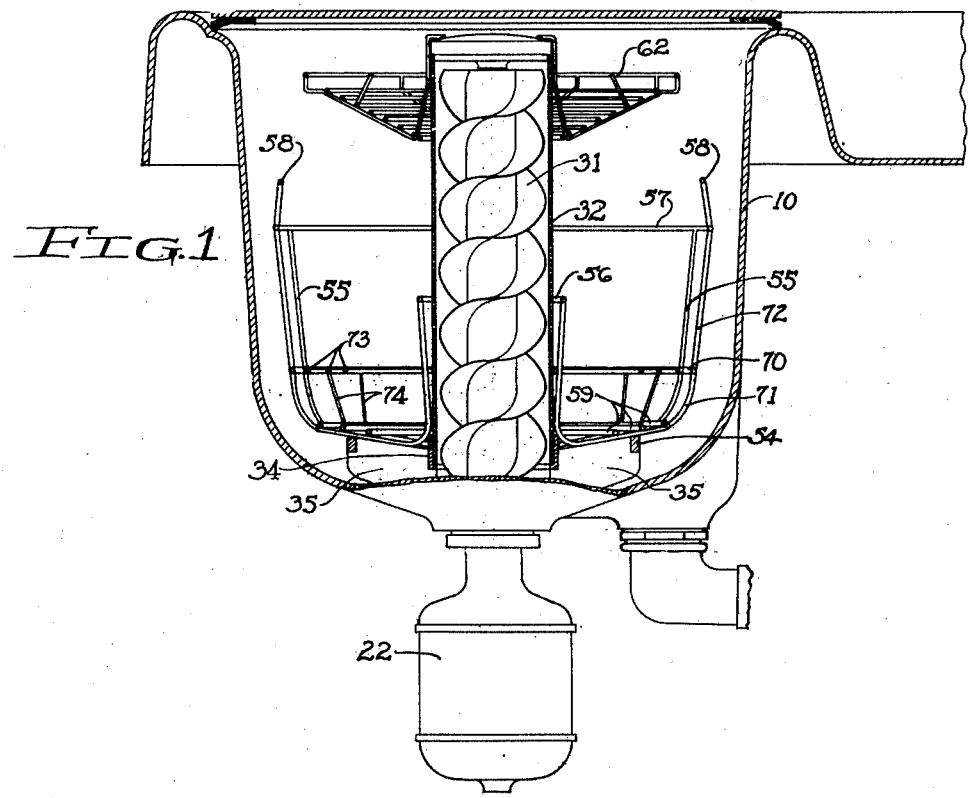
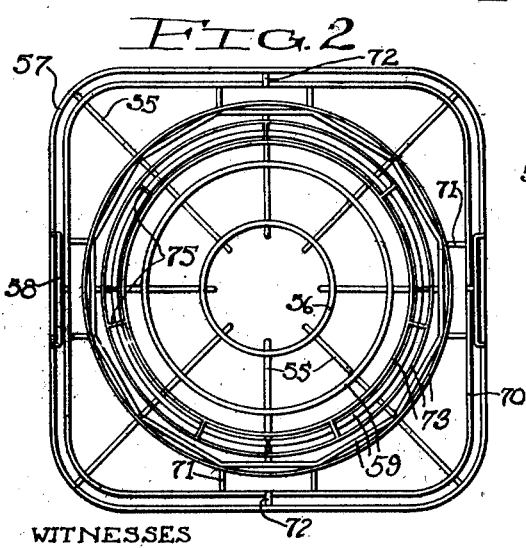
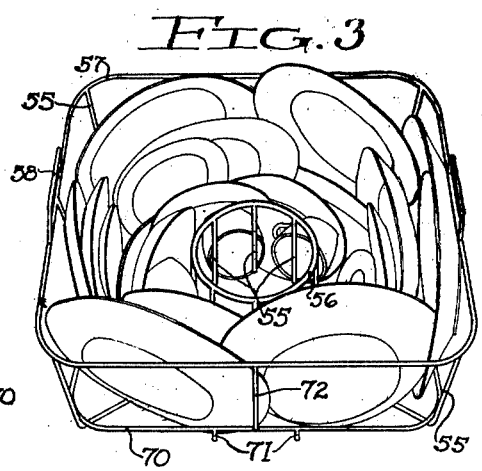
WITNESSES
INVENTOR.
Frank G. Brotz
BY
ATTORNEY.

Patented Apr. 2, 1929.

1,707,297

UNITED STATES PATENT OFFICE.

FRANK G. BROTZ, OF KOHLER, WISCONSIN, ASSIGNOR TO KOHLER COMPANY, OF KOHLER, WISCONSIN, A CORPORATION OF WISCONSIN.

BASKET FOR DISHWASHERS.

Application filed August 12, 1927. Serial No. 212,459.

This invention relates to a basket for dishwashers.

The invention has for its object to provide a basket for dishwashing machines of the type in which the water is forcibly ejected from a central tower or perforated cylinder by means of rapidly rotating screw blades and the object is to provide such a basket for holding dishes that will fit around the cylindrical tower and be properly supported above the bottom of the container and still be capable of ready removal by merely lifting the basket off the cylindrical tower.

An object of the invention is to provide a basket that may be loaded and unloaded when removed from the machine and which will properly support the dishes on edge and in an arrangement that will present their faces toward the radially projected jets of water to have all of their surfaces thoroughly cleaned by the impact and scouring action of such jets.

Another object of the invention is to insure against the possibility of dishes falling from the basket in moving the basket from place to place and in attaching it to and removing it from the machine, while at the same time offering little or no obstruction to the jets of water so that they may be fully effective for the cleaning operation.

Another object of the invention is to make such a basket of wire with the parts so arranged and related as to be strong and durable and to support the weight without bending.

With the above and other objects in view the invention consists in the basket for dishwashers as herein claimed and all equivalents.

Referring to the accompanying drawings in which like characters of reference indicate the same parts in different views, Fig. 1 is a sectional elevation of a dishwashing machine having as its lower basket the basket of the present invention;

Fig. 2 is a plan view of the basket; and

Fig. 3 is a perspective view of the basket loaded with dishes.

In these drawings 10 indicates a container of a dishwasher having an electric motor 22 mounted on its bottom with its motor shaft extending up through the bottom of the container and carrying a screw 31 surrounded by and closely fitting within a perforated metal cylindrical casing or tower 32 which extends to near the top of the container and is occupied by the screw for substantially its entire length.

In the bottom of the container is a support for the cylindrical casing 32 comprising a ring 34 mounted on radial blades 35 which are provided with cross-pieces 54 on their ends. These blades and their cross-pieces form a support for the basket of the present invention.

This basket consists of a number of radial wires 55, or wires arranged in radial planes about the axis of the machine, and each extending from a central ring 56 downwardly and slightly inwardly and then bending outwardly and slightly upwardly and then upwardly and joined to a wire ring 57 provided with handles 58. The outwardly extending portions of the radial wires 55 are connected by a series of concentric wire rings 59 and all wires are preferably welded together at their intersections.

An upper basket 62 is removably supported on the upper end of the cylindrical casing or tower tube 32 and is for supporting glassware and silverware. This basket as well as the washing machine proper form the subject-matter of separate applications and for that reason are not shown in detail in the present drawings.

The ring 56 is somewhat larger than the cylindrical casing 32 and is capable of freely passing over said casing in lifting the basket from the container or in replacing it, while the radial wires 55 converge as they leave the ring 56 to have a close fit around casing 32 to position the basket as it rests on the blades 35 and their cross-pieces 54. The ring 56 is located above the basket bottom at approximately two-thirds of the height of the basket, and at approximately one-third of the height of the basket there is a ring 70 generally square with rounded corners like ring 57 but slightly smaller, as seen in the plan view of Fig. 2. Both of these rings are secured to the diagonal radial wires 55 between which are shorter radial wires 55 that do not extend above the bottom of the basket formed by the wire rings 59. It will be seen in Fig. 2 also that the outer wire ring 59 is the shape of a twelve-sided figure with two angles between the angles through which the diagonal radial wires 55 pass and the wire 70 is connected with such intermediate angles by curved parallel short wires 71. Also, at the middle of each side of the basket, the top ring 57 and the intermediate ring 70 are connected by substantially vertical wires 72.

At approximately the level of the intermediate ring 70 there are three or more concentric plate-supporting rings 73 supported by substantially vertical short wires 74 connected to the radial wires at their junctions with the bottom rings. The outer ring 73 is preferably independent of the others but the others are preferably joined at intervals by short wires 75.

The three rings 73 form a plate-supporting rack at some distance above the bottom of the basket within which the plates and saucers are placed, their edges resting on and between the radial wires 55 and engaging against the bottom rings 59 to prevent them from slipping. Cups are placed in the inner part of the basket facing inwardly and behind them and inside of the inner ring 73 may be arranged saucers and other dishes of small diameter, and then in the partitioned space between the inner rings 73 somewhat larger dishes may be placed, and the largest dishes in the unpartitioned space between the outer rings, and finally the large serving dishes and platters may be arranged in the corners of the basket, and when so positioned all are firmly held in place and the basket may be moved from place to place without danger of the dishes falling or striking one another so as to be injured.

The elevated ring 56 and the radial wires 55 connected with it provide a well in the center of the basket properly guarding against the dishes falling out and permitting the basket being freely passed over the cylindrical casing 32 without danger of breaking the dishes.

The basket being made of wire with the wires welded together at their intersections forms a rigid, strong and durable holder for the dishes permitting of their convenient arrangement therein, such as will enable all of them to be exposed to the direct action of the radially projected water jets, the smaller dishes receiving the lower jets and the larger dishes the upper jets and all rapidly draining, so that all of the water is kept in action.

What I claim as new and desire to secure by Letters Patent is:

A basket for dishwashing machines of the type having a central tower from which water jets are ejected radially, comprising an inner ring, an outer ring substantially rectangular with rounded corners, radial wires connecting the inner ring with the outer ring at the corners of the latter and extending from the inner ring downwardly and slightly inwardly and then outwardly and slightly upwardly and then upwardly to the outer ring, concentric rings connecting the radial wires at their outwardly extending portions to form the bottom of the basket, an intermediate ring of the shape of the outer ring connected to the radial wires between the bottom of the basket and the outer ring, other radial wires between those first mentioned and of corresponding shape but extending from the inner ring to the outer concentric ring of the basket bottom, and a dish-supporting rack within the basket comprising concentric rings supported from and at a distance above the bottom of the basket.

In testimony whereof I affix by signature.

FRANK G. BROTZ.